(12) United States Patent
Michel et al.

(10) Patent No.: US 7,546,309 B1
(45) Date of Patent: Jun. 9, 2009

(54) METHODS AND APPARATUS FOR CREATING MIDDLEWARE INDEPENDENT SOFTWARE

(75) Inventors: Ruben Michel, Hopkinton, MA (US); Stanislav Sosnovsky, Upton, MA (US); Richard Francis Cormier, Franklin, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 379 days.

(21) Appl. No.: 11/095,406

(22) Filed: Mar. 31, 2005

(51) Int. Cl.
*G06F 17/30* (2006.01)

(52) U.S. Cl. .................... 707/102; 707/10; 707/100

(58) Field of Classification Search .............. 707/10, 707/100, 102
See application file for complete search history.

(56) References Cited

U.S. PATENT DOCUMENTS

| | | | |
|---|---|---|---|
| 5,923,879 A * | 7/1999 | Sasmazel et al. ............ 717/143 |
| 5,987,497 A * | 11/1999 | Allgeier ...................... 709/201 |
| 6,088,659 A * | 7/2000 | Kelley et al. ................. 702/62 |
| 6,189,010 B1 * | 2/2001 | Isip, Jr. ........................ 707/100 |
| 6,199,068 B1 * | 3/2001 | Carpenter ................... 707/100 |
| 6,591,272 B1 * | 7/2003 | Williams ..................... 707/102 |
| 6,721,741 B1 * | 4/2004 | Eyal et al. ...................... 707/10 |
| 6,778,979 B2 * | 8/2004 | Grefenstette et al. ........... 707/3 |
| 6,934,709 B2 * | 8/2005 | Tewksbary ................... 707/10 |
| 2003/0126136 A1 * | 7/2003 | Omoigui ..................... 707/10 |
| 2003/0163479 A1 * | 8/2003 | Mathews et al. ............ 707/102 |
| 2004/0133579 A1 * | 7/2004 | Campbell .................... 707/100 |
| 2004/0193634 A1 * | 9/2004 | Goodlett et al. ............. 707/102 |
| 2004/0267798 A1 * | 12/2004 | Chatterjee et al. ........... 707/102 |
| 2006/0080639 A1 * | 4/2006 | Bustelo et al. .............. 717/111 |
| 2006/0090154 A1 * | 4/2006 | Bustelo et al. .............. 717/110 |
| 2006/0224428 A1 * | 10/2006 | Schmidt et al. ................ 705/8 |

OTHER PUBLICATIONS

CORBA: "Common Object Request Broker Architecture, v3.0" Internet Publication, (Online) Jul. 2002 Retrieved from the Internet: http://www.omg.org/technology/documents/formal/corba_2.htm (retrieved on Jul. 18, 2007).*
Pope, Alan; "The CORBA reference guide: Understanding the common object request broker architecture"; 1998; Addison Wesley Longman; 1-380 pages.*

* cited by examiner

*Primary Examiner*—Don Wong
*Assistant Examiner*—Kim T Nguyen
(74) *Attorney, Agent, or Firm*—Chapin IP Law, LLC; Barry W. Chapin, Esq.

(57) ABSTRACT

A system abstracts an object model by receiving an object model specification defining application semantics for an application to access, via invocations, objects identified in the object model specification. The system applies a categorical-based generator that applies at least one morphism to the object model specification to generate an abstraction interface object model that preserves application semantics defined within the object model specification and is independent of a middleware object access mechanism. The system also generates an implementation of the abstraction interface object model for a particular middleware object access mechanism used to access data within objects corresponding to the object model specification.

18 Claims, 7 Drawing Sheets

METHODS AND APPARATUS FOR CREATING MIDDLEWARE INDEPENDENT SOFTWARE

BACKGROUND

Modern computer software applications are often distributed between computer systems and require ability to access and exchange information with other remotely operating software applications. Such exchanges of data and access to functionality often take place over a computer network such as a local area network or a wide area network such as the Internet. Due to the complexities and varying mechanisms of implementing functionality and data formats within modern software applications, software developers often employ software commonly referred to as "middleware" that provides a standardized mechanism for the exchange of information and access to functionality between two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintain by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

Conventional CORBA applications are composed of objects that are individual units of running software that combine functionality and data. Typically, there are many instances of an object of a single type. For example, an e-commerce website would have many shopping cart object instances, all identical in functionality but differing in that each is assigned to a different customer (i.e., client browser), and each contains data representing the merchandise that its particular customer has selected. For other object types, there may be only one instance. As an example, when a legacy application, such as an accounting system, is wrapped in code with CORBA interfaces and opened up to clients on a network, there is usually only one instance.

For each object type, such as the shopping cart mentioned above, a developer using middleware such as CORBA defines an interface in an OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

FIG. 1 is a prior art illustration of an invocation 90 by a single client process 80 for access to an object implementation 82 using middleware such as CORBA including an IDL stub 84, an object request broker 86, and an IDL skeleton 88. While the instant example uses CORBA as the middleware platform, the example applies to other conventional middleware platforms as well.

Prior to execution, a developer 70 using an IDL compiler 72 compiles an object model specification 74 defined in IDL into client IDL stubs 84 and object skeletons 88, and writes the code for the client 80 and for the object implementation 82. The stubs 84 and skeletons 88 serve as proxies for clients 80 and object 82 (e.g., server), respectively. Because IDL defines interfaces so strictly, the stub 84 on the client side has no trouble meshing perfectly with the skeleton 88 on the server side, even if the two are compiled into different programming languages. If CORBA is the middleware that provides the object request broker (ORB) 86, the CORBA ORB 86 can even be produced from different vendors so long as it conforms to the CORBA standard.

In CORBA, every object instance 82 has its own object reference in the form of an identifying electronic token or string. Clients 80 use the object references to direct their invocations 90, identifying to the ORB 86 the exact instance of an object 82 that the client 80 wants to invoke. Using the shopping cart example, this ensures that the shopping cart object 82 for one client 80 is different from a shopping cart object of another client. The client 80 acts as if it is invoking an operation on the object instance 82, but the client 80 is actually invoking a call on the IDL stub 84 that acts as a proxy to the object 82. Passing through the stub 84 on the client side, the invocation 90 continues through the ORB 86, and the skeleton 88 on the implementation side, to get to the object implementation 82 where it is executed. FIG. 1 thus shows invocation through a single machine.

FIG. 2 diagrams a remote invocation 92 that occurs over a network. In order to invoke the remote object instance 94, the client 80 first obtains its object reference using a naming or trader service. To make the remote invocation 92, the client 80 uses the same code used in the local invocation described in FIG. 1, but substitutes the object reference for the remote object instance 94. When the local ORB 86 examines the object reference and discovers that the target object 94 is a remote object, the local ORB 86 routes the invocation 92 out over a network 94 to the remote object's ORB 96.

To identify the correct object 94, the client 80 knows the type of object 94 that it is invoking (e.g., that it's a shopping cart object), and the client stub 84 and object skeleton 88 are generated from the same IDL object model specification 74. This means that the client 80 knows exactly which operations it may invoke, what the input parameters are, and where they have to go in the invocation. Accordingly, when the invocation 92 reaches the target object 94, all parameters are present. Additionally, the local client's 80 ORB 86 and the remote object's ORB 96 operate on a common protocol that provides a representation to specify the identity of the target object 94, its operation, and all parameters (input and output) of every type that they may use. Accordingly, although the local ORB 86 can tell from the object reference that the target object 94 is a remote object, the client 80 does not know the physical operating location of the target object 94. There is nothing in the object reference token obtained by the client 80 that the client holds and uses at invocation time that identifies the location of the target object 94. The token is opaque to the client. This ensures location transparency in order to simplify the design of distributed object computing applications.

Another example of middleware development environments are COM (Common Object Model) and DCOM (Distributed COM) developed by Microsoft Corporation of Redmond, Wash., USA. COM refers to both a specification and implementation developed by Microsoft Corporation which provides a framework for integrating components. This framework supports interoperability and reusability of distributed objects by allowing developers to build systems by assembling reusable components from different vendors which communicate via COM in a manner similar to that of the CORBA example provided above. By applying conventional COM to build systems of preexisting components, developers attempt to reap benefits of maintainability and adaptability. COM defines an application programming interface (API) to allow for the creation of components for use in integrating custom applications or to allow diverse components to interact.

However, in order to interact, COM components must adhere to a binary structure specified by Microsoft Corporation. As long as COM components adhere to this binary structure, components written in different languages can interoperate using COM on the Windows platform only. Distributed COM is an extension to COM that allows network-based component interaction. While COM processes can run on the same machine but in different address spaces, the DCOM extension allows processes to be spread across a network. With DCOM, components operating on a variety of other platforms can interact, as long as DCOM is available on those other platforms.

SUMMARY

Conventional mechanisms and techniques used for developing software applications that rely on middleware environments suffer from a variety of deficiencies. In particular, when a software developer produces an object model specification using an interface description language (IDL) and compiles this object model specification using a conventional middleware compiler such as a conventional CORBA IDL compiler, the conventional stubs 84 (FIG. 1) and skeletons 88 (FIG. 1) and any functionality exposed through the CORBA stubs or skeletons requires sophisticated knowledge of the IDL and its specific language mappings (to Java, C++, etc). Application programmers responsible for developing client 80 application code, who often lack this knowledge of middleware specific information, are often slowed down in their development efforts by the middleware-specific information produced within the generated IDL stubs 84 and IDL skeletons 88.

As a specific example, a CORBA interface typically consists of many IDL "types" including the interface itself, one or more super interfaces, enums, exceptions, sequences, structs, methods with parameters and return types, and so forth. When presented with an IDL interface object model specification 74, a conventional IDL-to-Java compiler emits the conventional IDL object model (stubs 84 and skeletons 88 in FIG. 1 above), which are realized by a plethora of Java classes and Java interfaces, each conforming to the IDL-to-Java mapping. While this object model is ORB-vendor independent, unfortunately, the conventional emitted files are cluttered with middleware-specific (i.e., CORBA) information, such as CORBA markers, interface-repository information, references to the CORBA ORB and its methods, methods invoked by the CORBA ORB, marshalling functionality, and the like. Such middleware-specific information is often distracting and confusing to client development programmers unfamiliar with CORBA. As a result, the programmers who must utilize the stubs and skeletons must become familiar to some extent with middleware-specific information presented within the interface stubs 84 and skeletons 88. The programmers are thus less efficient. The programmers can become significantly more productive if they program using CORBA-independent stubs and skeletons, but conventional middleware development platforms do not provide such capability.

Additionally, in the event that an owner of software desires to change the middleware system, for example, from CORBA to a middleware system such as COM, the client application software that relies on the middleware system must be revised so that the middleware-specific references utilized within the IDL stubs and skeletons comply with the new selected middleware environments. Accordingly, initial selection of a conventional middleware environment can become an important decision when creating software using conventional middleware development techniques due to the future difficulty of switching to a different middleware platform after the software has been developed using a chosen middleware platform. As new middleware platforms enter the marketplace and/or as existing platforms are equipped with more features (or client application requirements change), dependence upon a specific middleware platform can become problematic.

Embodiments of the invention include a software development system that significantly overcomes the aforementioned deficiencies and provides mechanisms and techniques that apply a categorical approach to these problems. As an example, given an object model, specified in for example an Interface Description Language (IDL), the system disclosed herein generates an abstraction of that object model that preserves the application semantics expressed in the IDL, but that is middleware independent. In addition, the system explained herein generates an implementation of that abstraction for a particular middleware such as CORBA or another selected middleware platform. As a specific example, if the system disclosed herein receives, as input, a CORBA interface defined in IDL, the system operates as explained herein to output an abstracted, CORBA-independent, object model that exposes the functionality of the CORBA interface and also outputs an implementation of that object model using CORBA but that is hidden from the application developer.

In one embodiment, a system operates a method of abstracting an object model by receiving an object model specification defining application semantics for an application to access, via invocations, objects identified in the object model specification. This can be the IDL object model specification used in the above example. The system applies a categorical-based generator that applies at least one morphism to the object model specification. Application of the categorical-based generator generates an abstraction interface object model that preserves application semantics defined within the object model specification and that is independent of a middleware object access mechanism (e.g., CORBA, COM, TIBCO, RMI, etc.) used to access data within objects corresponding to the object model specification. The categorical-based generator also generates an implementation of the abstraction interface object model for a particular middleware object access mechanism (e.g., for CORBA or another selected middleware) used to access data within objects corresponding to the object model specification.

Application of the categorical-based generator conceals all middleware-related information in the implementation of the abstraction interface object model, while preserving application functionality of an application that uses the object model specification in the abstraction interface object model.

In one embodiment, application of the categorical-based generator that applies at least one morphism to the object model specification comprises visiting each IDL type defined in the IDL once and, for each IDL type visited, applying a morphism to map the IDL type one-to-one and onto, and in an invertible manner by defining at least one corresponding morphism for that type within the abstraction interface object model. The corresponding morphism preserves inheritance among application interfaces defined in the abstraction interface object model and preserves all relationships among the application interfaces.

Again using CORBA as an example middleware platform, generation of the abstraction interface object model (i.e., an abstracted interface object model) conceals all the CORBA-related information, while preserving application functionality, while generation of the implementation of the abstraction interface object model produces a CORBA-implementation object model that implements the interfaces and abstract classes in the interface object model using CORBA, but that is hidden form the programmer developing an application. In this manner, a software developer can obtain the benefits of middleware such as CORBA without having to have knowledge of CORBA and without having interface calls cluttered with CORBA specific information. Additionally, since the generated modules explained herein insulate the application developer from the underlying middleware implementation, the middleware can be changed without having to re-write application code, thus saving significant time and expense.

Other embodiments include computerized devices, such computer systems, workstations or other devices configured or operable to process and perform all of the method and processing operations disclosed herein as embodiments of the invention. In such embodiments, a computer system includes a memory system, a processor, a communications interface and optionally a display and an interconnection mechanism connecting these components. The memory system is encoded with a generator application that when performed on the processor, produces a generator process that operates as explained herein to perform all of the method embodiments and operations explained herein as embodiments of the invention.

Other arrangements of embodiments of the invention that are disclosed herein include software programs to perform the method embodiment steps and operations summarized above and disclosed in detail below of the report generator process. More particularly, a computer program product is disclosed that has a computer-readable medium including report generator computer program logic encoded thereon that when performed in a computerized device provides operations of the generator application and process as respectively explained herein. The computer program logic, when executed on at least one processor with a computing system, causes the processor to perform the operations (e.g., the methods) indicated herein as embodiments of the invention. In addition, the abstracted and implementation object models explained herein when encoded on a computer readable medium represent embodiments of the invention as well. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other software development entities can also provide the system of the invention. The system of the invention can be distributed between many software processes on several computers, or processes such as the generator process can execute on a dedicated computer alone and the report definitions can be remotely accessed. The generator may be integrated into a storage area network management application as well.

It is to be understood that the system of the invention can be embodied strictly as a software program, as software and hardware, or as hardware alone. Example embodiments of the invention may be implemented within EMC's Control Center and StorageScope software application(s) that provide management functionality for storage area network resources and in computerized devices that operate the ControlCenter software. ControlCenter is a trademark owned by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention are able to receive an object model, specified for example in an Interface Description Language (IDL), and are able to generate an abstraction of that object model that preserves the application semantics expressed in the IDL, but that is middleware independent. In addition, the system explained herein generates an implementation of that abstraction for a particular middleware such as CORBA or another selected middleware platform. As a specific example, if the system disclosed herein receives, as input, a CORBA interface defined in IDL, the system operates as explained herein to output an abstracted, CORBA-independent, object model that exposes the functionality of the CORBA interface and also outputs an implementation of that object model using CORBA but that is hidden from the application developer.

Using CORBA as an example, one purpose of the abstracted interface object model is to conceal all the CORBA-related information, while preserving application functionality. One purposes of the CORBA-implementation object model is to implement the interfaces and abstract classes in the interface object model using CORBA. To do so, the system disclosed herein provides a categorical-based generator. Through application of morphisms to the object model specification, the system conceals all middleware-related information, while preserving application functionality of an application that uses the object model specification.

Example discussions of embodiments disclosed herein use CORBA as a middleware platform for ease of discussion of processing. However, it is to be understood that the system disclosed herein is not limited to CORBA and that other implementation object models could also be emitted, based on various middleware technologies such as RMI, Tibco, or COM. Furthermore, a no-middleware object model could be emitted for a configuration that uses collocation.

Embodiments disclosed herein are based in part on the observation that in a typical CORBA or other middleware application, IDL types are intertwined in various ways. For example, methods in interfaces are parameterized with enums, structs, other interfaces, and often throw exceptions. Similarly, structs may contain members which are themselves structs, enums or sequences thereof. Accordingly, in order to generate the object models disclosed herein, the categorical-based generator analyzes the IDL object model. By applying the categorical approach of the system disclosed herein, the categorical-based generator only need to visit each IDL type once, thereby significantly improving the generator's performance and memory requirements.

It is to be understood that the invention is not limited to receiving an object model specification in IDL. IDL is used in the examples herein since it is language and platform neutral. In other words, IDL was chosen because it is platform- and language-neutral, not due to its CORBA origins.

Figure 1:
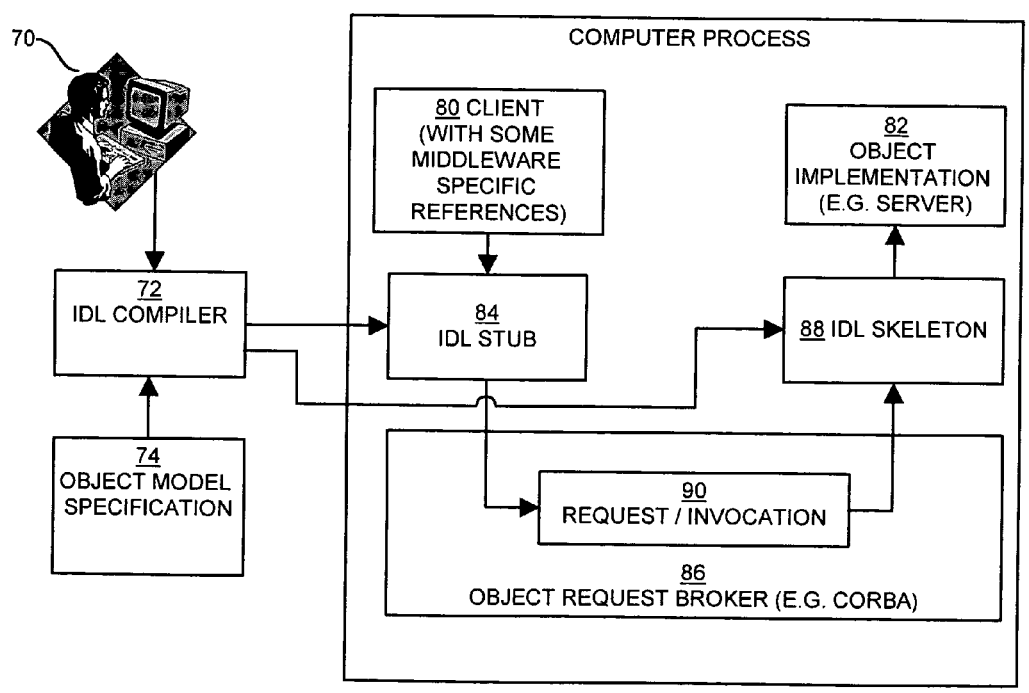
FIGS. 1 and 2 are prior art illustrations of operations of conventional middleware.
Figure 2:
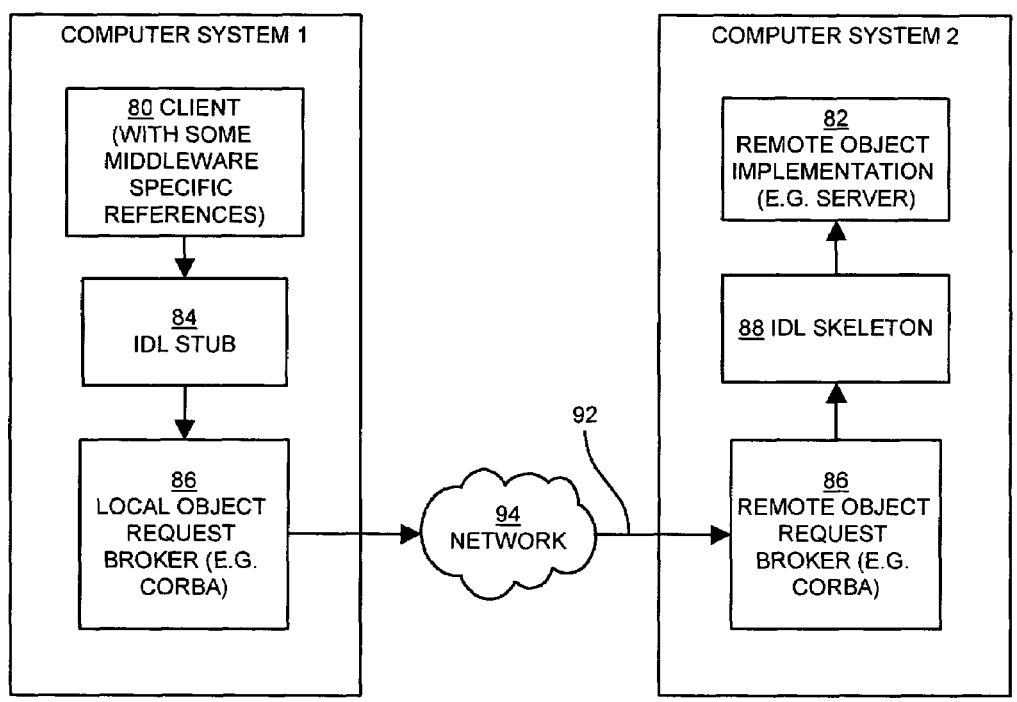
Figure 3:
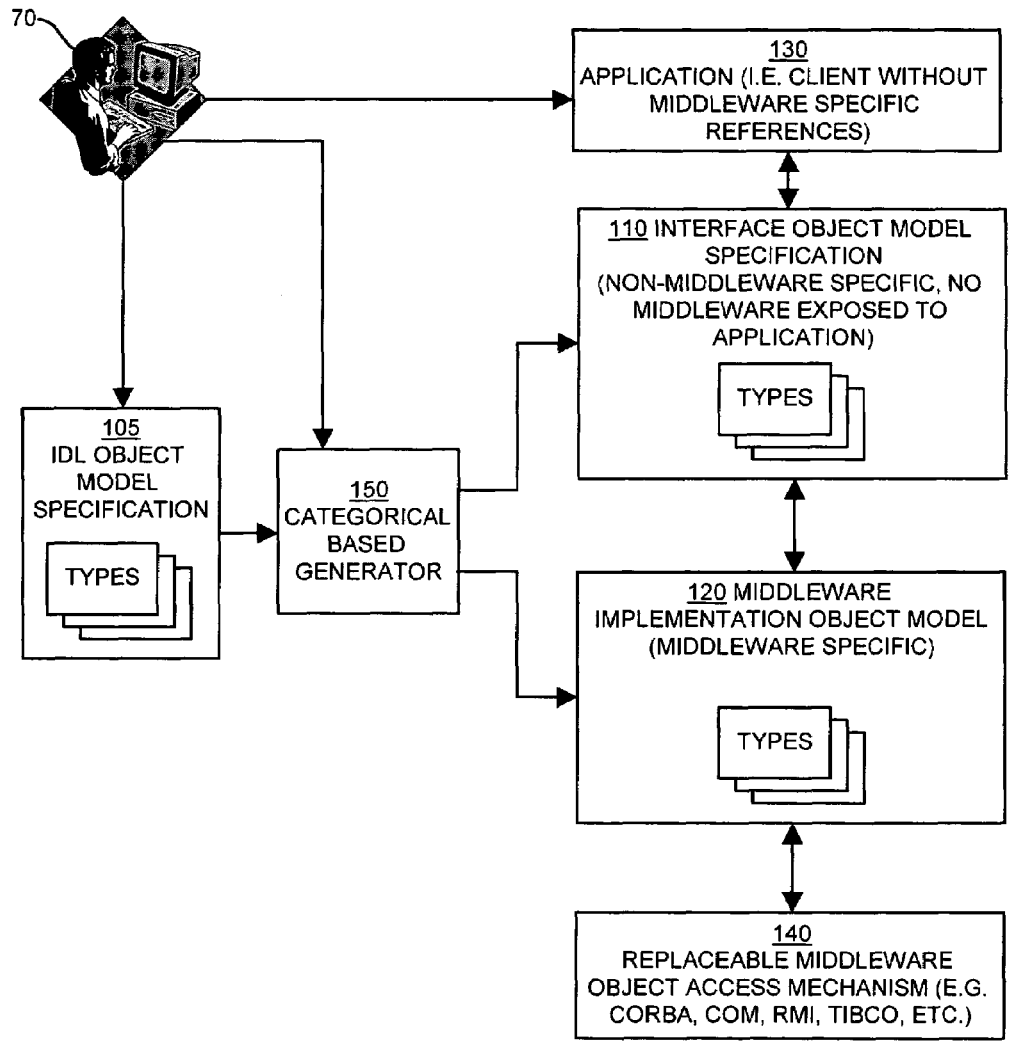
FIG. 3 illustrates an example software generation environment that operates according to embodiments disclosed herein.

FIG. 3 illustrates an application development environment 100 suitable for use in explaining example embodiments of the system disclosed herein. The system disclosed herein allows a developer 101 to provide an IDL object model 105 is input to a categorical-based generator 150 configured in accordance with embodiments of the invention. A categorical-based generator 150 examines each type defined in the IDL object model 105 and produces, as output, an abstraction interface object model 110 that is an abstraction of the IDL object model specification 105 that can be utilized by the developer 101 when creating the application 130, but that hides any middleware related information. Additionally, the categorical-based generator 150 (hereinafter the generator 150) produces an implementation 120 of the abstraction interface object model for a particular middleware object access mechanism 140 used to access data within objects corresponding to the object model specification 105.

Figure 4:
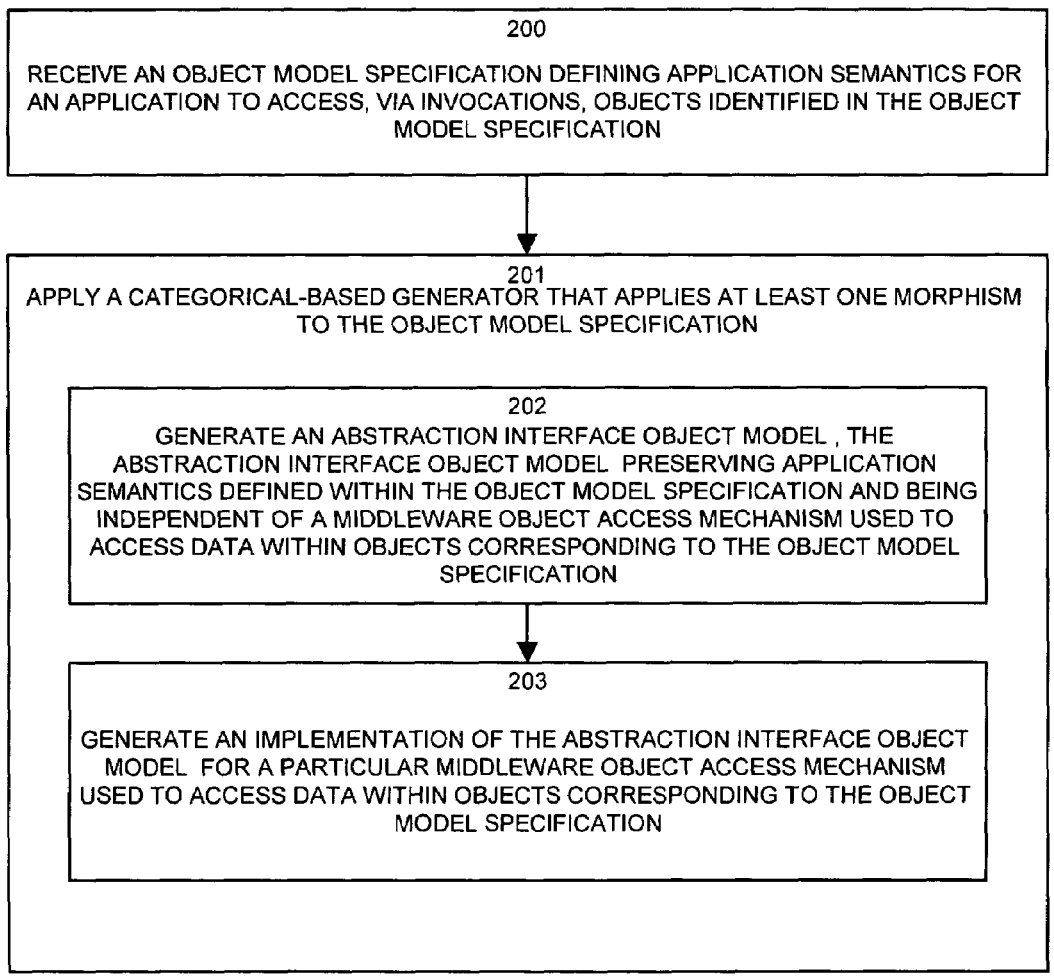
FIG. 4 is a flow chart of processing steps performed by a generator to produce the abstract interface object model and the implementation object model in accordance with embodiments disclosed herein.

FIG. 4 is a flow chart of processing steps that the categorical-based generator 150 performs to produce the aforementioned software entities 110 and 120.

In step 200, the generator 150 receives an object model specification 105 defining application semantics for an application 130 to access, via invocations, objects identified in the object model specification 105.

In step 201, the generator 150 applies at least one morphism to the object model specification.

As shown in sub-step 202, application of the categorical-based generator 150 generates the abstraction interface object model 110 of the object model specification. The abstraction interface object model 110 preserves application semantics defined within the object model specification 105 while remaining independent of the middleware object access mechanism 140 used to access data within objects corresponding to the object model specification 105. Generally then, applying at least one morphism to the object model specification includes concealing all middleware-related information in the implementation of the abstraction interface object model 110, while preserving application functionality of an application that uses the object model specification in the abstraction interface object model.

In sub-step 203, application of the categorical-based generator 150 further generates the implementation 120 of the abstraction interface object model for a particular middleware object access mechanism 140 used to access data within objects corresponding to the object model specification 105. Generating an implementation 120 of the abstraction interface object model for a particular middleware object access mechanism 140 can do so for particular middleware object access mechanisms such as CORBA, COM, RMI and Tibco or others.

Figure 5A:
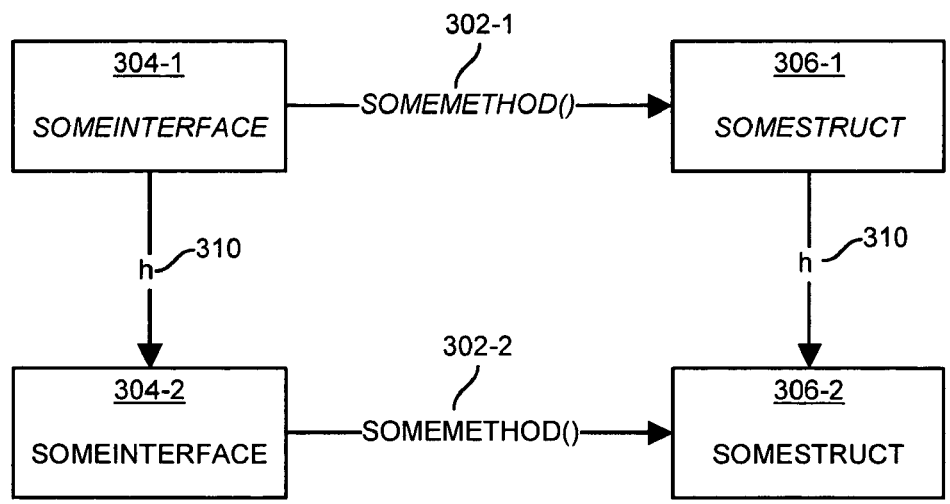
FIG. 5A shows an example definition of a morphism in accordance with embodiments disclosed herein.

FIG. 5A shows a block diagram that illustrates the nature of the morphism(s) applied by the generator 150 to types in the object model specification 105. Consider a simple example consisting of a method someMethod 302-1 in an IDL interface SomeInterface 304-1, which accepts no parameters, but returns an IDL struct SomeStruct 306-1.

Interface and method code used in as an example might appear generally as follows:

```
interface someInterface
{
SomeStruct someMethod( );
};
```

The illustrated IDL object model types 302-1, 304-1 and 306-1 are displayed in italic, while the interface object-model types 302-2, 304-2, 306-2 are displayed in regular font, respectively. If h denotes a morphism 310 applied in the generator 150, then the illustrated standard, categorical, commutative diagram holds true and provides the definition of the morphism as used herein. Note that this diagram extends readily to parameterized methods.

Figure 5B:
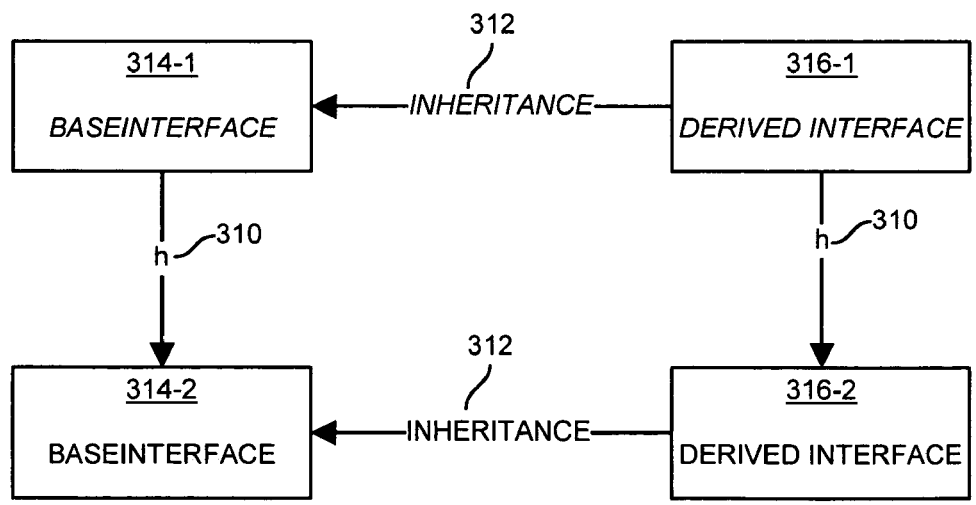
FIG. 5B shows example inheritance properties of a morphism in accordance with embodiments disclosed herein.

FIG. 5B shows how the morphism 310 preserves inheritance 312 among application base interfaces 314-1 and 314-2 and derived interfaces 316-1 and 316-2. It is noted that the morphism 310 also preserves all other relationships among application interfaces.

Concerning where the morphism should be physically located, since IDL-generated types should not be modified, the morphism 310 does not preferably reside there. In one configuration, the morphism 310 could be instantiated as one or more static methods in some class; however, the homeomorphic access would then become verbose. The remaining alternative is placing the morphism 310 in the types of the abstracted interface object model 110. Since the morphism 310 maps application types one-to-one and onto, it is invertible. For emitting cleaner code, it is more convenient to implement the morphism 310 from the interface object model 110 to the IDL object model 105. This latter morphism 310 is distributed among the many generated types in the interface object model 110.

Figure 6:
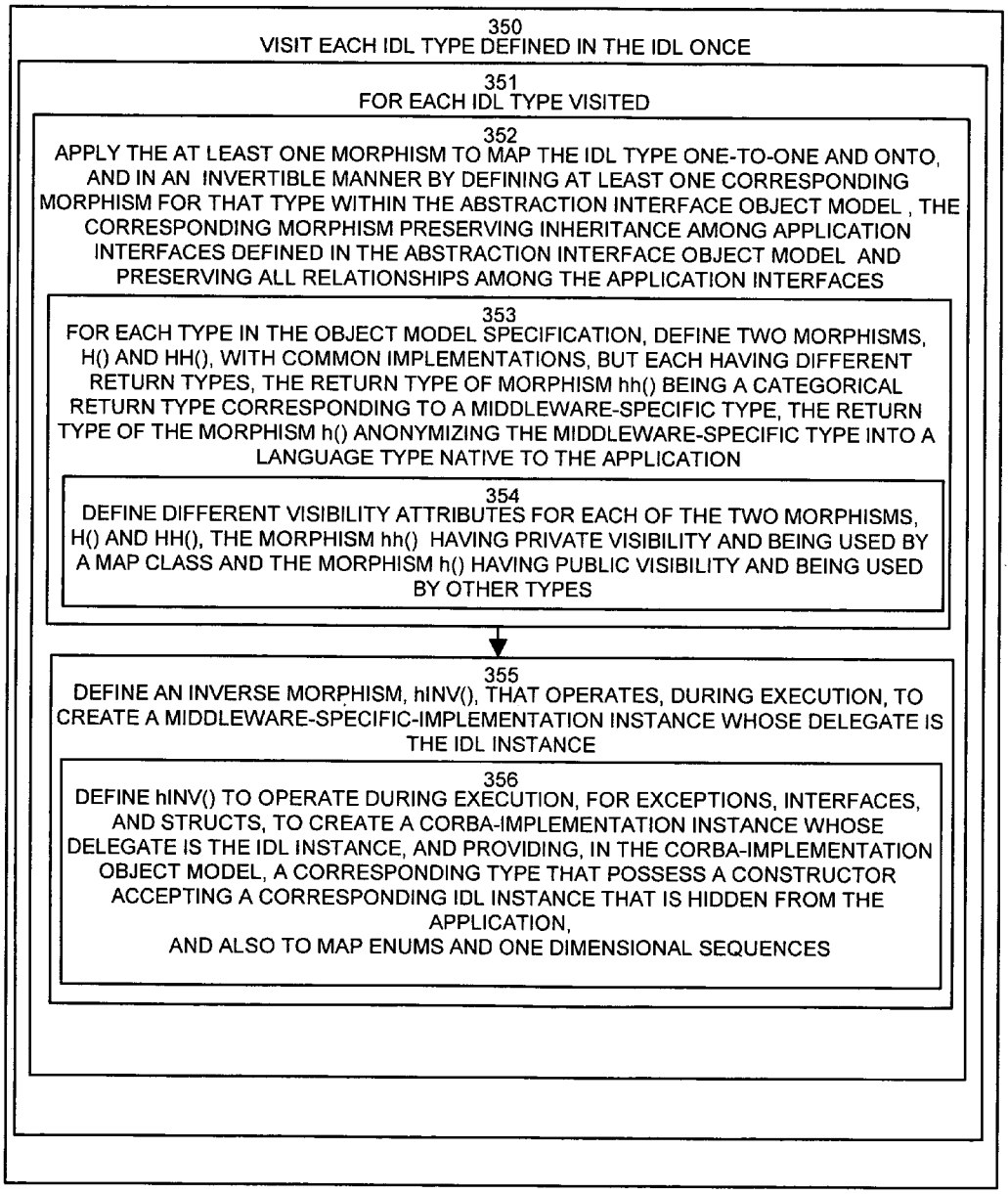
FIG. 6 is a flow chart of detailed processing steps performed by a generator to produce the abstract interface object model and the implementation object model in accordance with an example embodiment disclosed herein.

FIG. 6 is flow chart of processing steps that show details of application of the categorical-based generator 150 that applies at least one morphism 310 to the object model specification 105 in accordance with embodiments disclosed herein.

In step 350, the generator 150 visits each IDL type defined in the IDL 105 once.

In step 351, the generator enters a processing loop that occurs for each IDL type visited.

In step 352, the generator 150 applies at least one morphism to map the IDL type one-to-one and onto, and in an invertible manner by defining at least one corresponding morphism (i.e. code) 310 for that type within the abstraction interface object model 110. The corresponding morphism 310 preserves inheritance among application interfaces defined in the abstraction interface object model 110 and preserves all relationships among the application interfaces. The categorical nature of the morphism is clearly exhibited in the following code snippet:

```
package com.emc.eccapi.bridge.admin;
public class ComponentAdminImpl_
    implements     com.emc.eccapi.bridge.admin.IComponentAdmin,
        com.emc.eccapi.bridge.framework.ILookup
{
    ...
    public void
    deployComponent(com.emc.eccapi.bridge.framework.IComponentId componentId__0,
    com.emc.eccapi.bridge.framework.IFile file__1)
        throws
    com.emc.eccapi.bridge.admin    ComponentAdminPackage.Failure
    {
        {
        try
        }
    hh(    ).deployComponent((com.emc.eccapi.framework.ComponentId)componentId__0.h( )
        , com.emc.eccapi.framework.File) file__1.h( )
        );
    }
    catch(com.emc.eccapi.admin.ComponentAdminPackage.Failure e)
    {
        throw
    com.emc.eccapi.bridge.admin.ComponentAdminPackage.FailureImpl_.hInv(e);
    }
    }
    }
    private com.emc.eccapi.admin.ComponentAdmin hh( )
    {
    return this.delegate;
    }
    public java.lang.Object h( )
    {
    return this.delegate;
    }
    ...
    private final com.emc.eccapi.admin.ComponentAdmin
        delegate;
}
```

FIRST CODE SNIPET

In step 353, and as shown in the above first code snippet, for each type in the object model specification, the generator 150 defines two morphisms, h( ) and hh( ), with common (i.e. identical) implementations, but each having different return types, the return type of morphism hh( ) being a categorical return type corresponding to a middleware-specific type, and the return type of the morphism h( ) anonymizing the middleware-specific type into a language type generic to the application.

This is shown in sub-step 354 where the generator 150 defines different visibility attributes for each of the two morphisms, h( ) and hh( ), the morphism hh( ) having private visibility and being used within the class and the morphism h( ) having public visibility and being used by other types Accordingly, two morphisms are defined, h( ) and hh( ), with identical implementations, but different return types and visibility attributes. As expected categorically, the return type of hh( ) is the corresponding CORBA type. However, one essential goal of the interface object model is to conceal CORBA. Therefore, the morphism h( ) is provided, which anonymizes the CORBA type into a java.lang.Object. The morphism hh( ) is used extensively in the defining class, and only there—hence its private visibility. In contrast, ho is used extensively by other types—hence its public visibility.

To illustrate the categorical approach further as used in the system disclosed herein, consider the following interface-inheritance hierarchy in IDL:

Sample IDL-inheritance hierarchy.

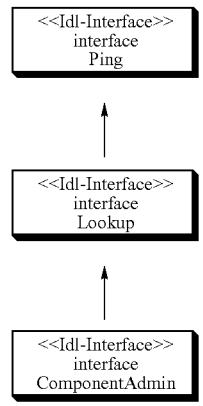

Each CORBA-implementation type implements the morphism differently. For interfaces, structs, and exceptions, the morphism 310 simply delegates to an instance of the IDL type. Consequently, no copying overhead is incurred. Surprisingly, for enums the morphism 310 involves no delegation at all; instead, the morphism 310 maps static instances based on their underlying integer values. The following second code snippet illustrates a non-delegating morphism:

```
package com.emc.eccapi.bridge.framework;
public final class ComponentTypeImpl_ extends ICompo-
    nentType
{
 . . .
    public java.lang.Object h( )
    {
        return
com.emc.eccapi.framework.ComponentType.from_int
    (value);
    }
 . . .
    private int value;
}
```

SECOND CODE SNIPET

The generator 150 maps IDL sequences by a C++ template-like mechanism. When such a sequence is encountered in the IDL definition, and only then, a Java array-to-array adapter is emitted. Thus the mapping is parsimonious and effective. IDL types often map directly into standard Java types, such as int, String, arrays of Strings, etc; such types appear identically in the object models.

Returning attention now back to the flow chart of processing steps in FIG. 6, in step 355, the generator 150 defines an inverse morphism, hInv( ), that operates, during execution, to create a middleware-specific-implementation instance whose delegate is the IDL instance.

An example of an inverse morphism, hInv( ) is shown in the first code snippet shown above. The inverse morphism hInv( ) operates as follows: for exceptions, interfaces, and structs, it simply creates a CORBA-implementation instance whose delegate is the IDL instance. Hence, in the CORBA-implementation object model, each such type must possess a constructor accepting a corresponding IDL instance; this constructor, however, is hidden from application developers. For enums, the inverse morphism, like the morphism, maps static instances based on their underlying integer value.

This is shown in the flow chart in step 356, where the middleware-specific-implementation is a CORBA implementation and the implementation of the abstraction interface object model is a CORBA-implementation object model. In this case, the generator 150 defines hInv( ) to operate during execution, for exceptions, interfaces, and structs, to create a CORBA-implementation instance whose delegate is the IDL instance, and provides, in the CORBA-implementation object model, a corresponding type that possess a constructor accepting a corresponding IDL instance that is hidden from the application.

In one example configuration, the generation of the interface 110 and CORBA-implementation 120 object models relies heavily on Java reflection. Specifically, the generator 150 reflects on each CORBA type in the IDL object model 105, and emits, when necessary, corresponding types in the interface and CORBA-implementation object models. Through reflection, the generator 150 examines CORBA markers in the IDL-generated code in order to determine whether the CORBA type is an enum, an exception, an interface, or a struct. More specifically, IDL user exceptions are the only type derived from org.omg.CORBA.UserException. In the IDL object model 105, each IDL interface SomeInterface invariably derives from an "Operations" Java interface, SomeInterfaceOperations, in this example. Each enum always has a protected constructor and methods with signatures from_int(int value) and value( ).

Additionally, an essential element of code generation that allows the generator 150 to discover, for example for a given interface, all the types needed to support that interface in the interface object model. Reflection is used by the generator 150 again and while reflecting on each type, each of its constituent types is also discovered. These discovered types then fuel a recursive traversal. Consequently, reflection finds three significant usages in the generator 150: identifying the nature of the type (enum, exception, interface, sequence, or struct), providing information for generating each type in the generated object models, and recursively discovering all the dependent types for fully constructing the emitted object models.

Figure 7:
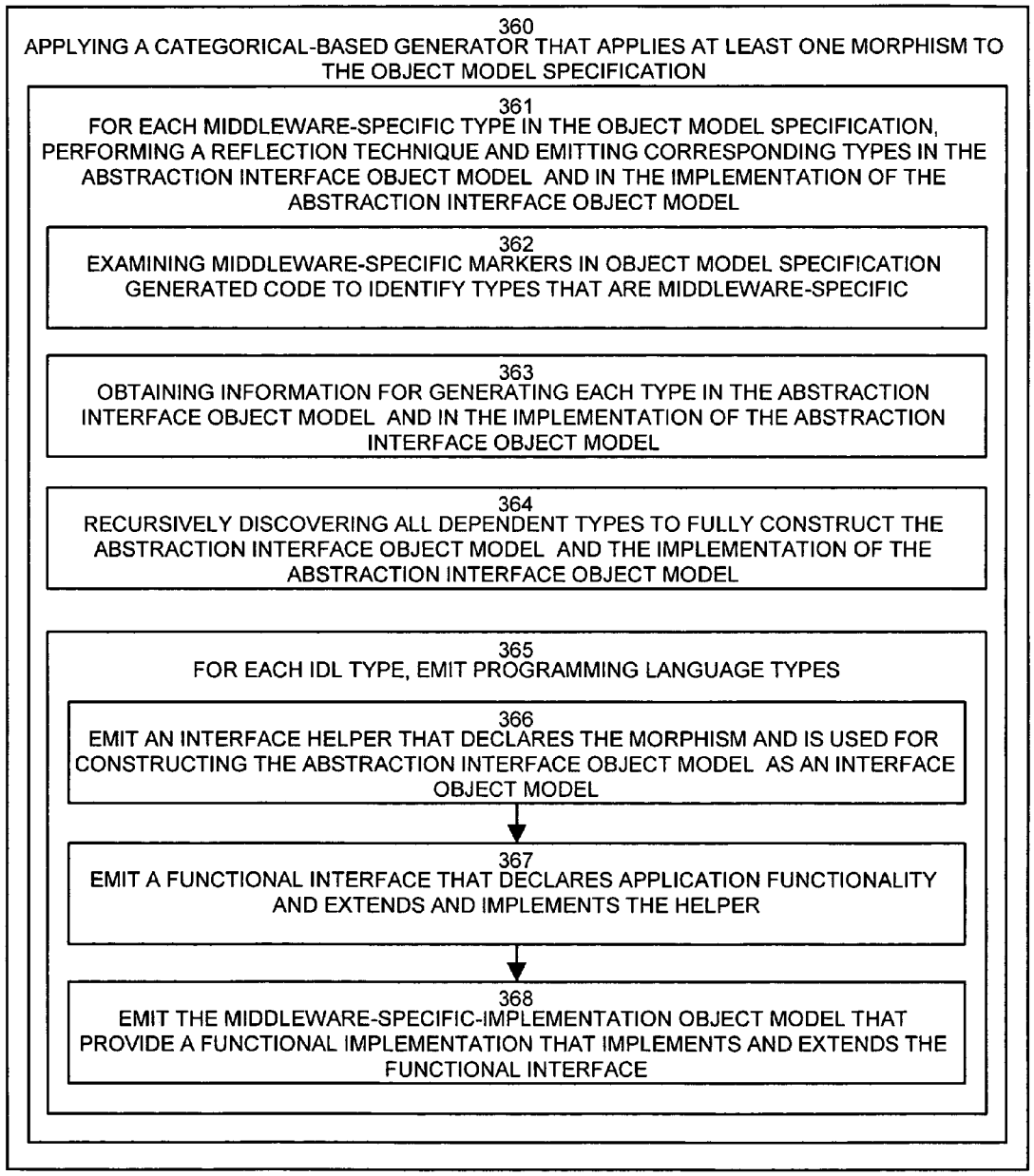
FIG. 7 is a flow chart of detailed processing steps performed by a generator to produce the abstract interface object model and the implementation object model in accordance with an example embodiment disclosed herein.

FIG. 7 shows the nature processing that the generator 150 performs in step 360 to apply a categorical-based generator that applies at least one morphism to the object model specification.

In step 361, for each middleware-specific type in the object model specification 105, the generator 150 performs a reflection technique and emits corresponding types in the abstraction interface object model and in the implementation of the abstraction interface object model. Details of performing reflection are shown in sub-steps 362 through 368.

More specifically, in step 362, the generator 150 examines middleware-specific markers in object model specification generated code to identify derived types that are middleware-specific.

In step 363, the generator 150 obtains information for generating each type in the abstraction interface object model 110 and in the implementation of the abstraction interface object model 120.

In step 364, the generator 150 recursively discovers all dependent types to fully construct the abstraction interface object model and in the implementation of the abstraction interface object model.

In step 365, for each IDL type in the object model specification, the generator 150 emits programming language types. Specifically, for each IDL type, three Java types are emitted into three separate files as follows. For constructing the interface object model, the Java interface helper is emitted declaring the morphism, and the functional interface is emitted (either a Java interface or a Java abstract class) declaring the application functionality. The functional interface extends or implements the helper. For constructing the CORBA-implementation object model, the functional implementation is emitted, a Java class that implements or extends the functional interface. The current generator supports IDL enums, exceptions, interfaces, sequences, and structs.

This is shown in FIG. 7 in sub-steps 366 through 368.

In step 366, the generator 150 emits an interface helper that declares the morphism and is used for constructing the abstraction interface object model as an interface object model.

In step 367, the generator 150 emits a functional interface that declares application functionality and extends and implements the helper.

In step 368, the generator 150 emits the middleware-specific-implementation object model that provide a functional implementation that implements and extends the functional interface.

At application runtime, there is a brief moment when the interface object model meets the CORBA universe in the application's code. This occurs when a CORBA reference is first encountered in the application code; such a reference could have been obtained by invoking the ORB's string_to_object( ) on a stringified IOR, or by querying a naming or trading service. The reference is immediately encapsulated in an appropriate interface in the CORBA-implementation object model, and is exposed as an interface in the interface object model. That latter interface becomes the single invocation point for that CORBA reference. Therefore, each interface in the CORBA-implementation object model must possess a public constructor that accepts a CORBA reference. At runtime, that reference is immediately narrowed into a strongly typed CORBA interface, which becomes the delegate of the CORBA-implementation interface. The following third code snippet provides an example of this:

```
package com.emc.eccapi.bridge.admin;
public class ComponentAdminImpl_
    implements    com.emc.eccapi.bridge.admin.IComponentAdmin,
        com.emc.eccapi.bridge.framework.ILookup
{
    ...
    public ComponentAdminImpl_(java.lang.Object corbaObject)
    (
        this.delegate=
com.emc.eccapi.admin ComponentAdminHelper.narrow(corbaObject);
    }
    ...
    private final com.emc.eccapi.admin.ComponentAdmin delegate;
}
```

MEETING CORBA IN THE CORBA-IMPLEMENTATION OBJECT MODEL.

The abstracted interface object model 110 manages interface upcasting very gracefully. Specifically, since the interface object model 110 preserves the interface hierarchy in the IDL object model (excluding CORBA-specific types), interface upcasting maps transparently to Java upcasting. Regrettably, downcasting is more problematic, since CORBA downcasting is incompatible with Java downcasting. Hence, for each interface that may require downcasting, the generator 150 provides a static downcast( ) method which performs as follows: it first applies the morphism on the interface that requires downcasting to retrieve the delegate; then it applies the CORBA narrow( ) operator to perform the downcast, and finally, it invokes the inverse morphism to create the required interface in the interface object model. An example of this downcast processing is shown below in the following code snipet:

```
package com.emc.eccapi.bridge.admin;
public class ComponentAdminImpl_
    implements    com.emc.eccapi.bridge.admin.IComponentAdmin,
        com.emc.eccapi.bridge.framework.ILookup
{
    ...
    static  public   com.emc.eccapi.bridge.admin.IComponentAdmin
    downcast(com.emc.eccapi.client.framework.ILookup lookup)
    {
        return com.emc.eccapi.bridge.admin ComponentAdminImpl_.hInv(
            com.emc.eccapi.admin ComponentAdminHelper.narrow(
                (com.emc.eccapi.framework.Lookup) lookup.h( )
    }
    static  public   com.emc.eccapi.bridge.admin.IComponentAdmin
    downcast(com.emc.eccapi.bridge.framework.IPing ping)
    {
        return     com.emc.eccapi.bridge.admin.ComponentAdminImpl_.hInv(
            com.emc.eccapi.admin.ComponentAdminHelper.narrow(
                (com.emc.eccapi.framework.Ping) ping.h( )
            )
    }
    ...
}
```

Is to be understood that embodiments include the generator 150 as a software application, or as part of another application, or as logic instructions and/or data encoded within a fixed or removable computer readable medium such as a floppy disk, hard disk or in an optical medium, or in a memory system such as in firmware, read only memory (ROM), or, as in the previous examples, as executable code within a memory system (e.g., within random access memory or RAM). It is also to be understood that other embodiments provide the generator 150 operating within a processor as a process. While not shown in this example, those skilled in the art will understand that a computer system can implement the generator and may include other processes and/or software and hardware components, such as an operating system. Thus embodiments of the invention include the generator program existing as either code in unexecuted form on a computer readable medium (e.g., as a software program on a transportable medium such as a CDROM) or as an executing software process or as a computer system configured to operate as explained herein.

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above. The report generator can operate on shared computing resources, or can be distributed among any number of computer systems. Furthermore, embodiments of the invention may operate to map application code to middleware in a storage area network management application.

What is claimed is:

1. A method of abstracting an object model, the method comprising:
receiving an object model specification defining application semantics for an application to access, via invocations, objects identified in the object model specification;
applying a categorical-based generator that applies at least one morphism to the object model specification, application of the categorical-based generator generating:
i) an abstraction interface object model, the abstraction interface object model preserving application semantics defined within the object model specification and being independent of a middleware object access mechanism used to access data within objects corresponding to the object model specification; and
ii) an implementation of the abstraction interface object model for a particular middleware object access mechanism used to access data within objects corresponding to the object model specification;
wherein object model specification is defined in an interface description language (IDL) that includes a plurality of IDL types; and
wherein applying a categorical-based generator that applies at least one morphism to the object model specification comprises:
visiting each IDL type defined in the IDL once;
for each IDL type visited applying the at least one morphism to map the IDL type one-to-one and onto into application types by defining at least one corresponding morphism for that type within the abstraction interface object model, the corresponding morphism preserving inheritance among application interfaces defined in the abstraction interface object model and preserving all relationships among the application interfaces; and
for each type in the object model specification, defining two morphisms, h( ) and hh( ), with common implementations, but each having different return types, the return type of morphism hh( ) being a categorical return type corresponding to a middleware-specific type, the return type of the morphism h( ) anonymizing the middleware-specific type into a language type generic to the application.

2. The method of claim 1 wherein applying a categorical-based generator that applies at least one morphism to the object model specification comprises:
concealing all middleware-related information in the implementation of the abstraction interface object model, while preserving application functionality of an application that uses the object model specification in the abstraction interface object model.

3. The method of claim 1 wherein applying the at least one morphism to map the IDL type one-to-one and onto into application types by defining a corresponding morphism for that type within the abstraction interface object model comprises:

implementing the at least one inverse morphism from the abstraction interface object model to the IDL object model specification and distributing the inverse morphism among generated types in the implementation object model that provides an interface object model.

4. The method of claim 1 wherein defining two morphisms, h( ) and hh( ), comprises:
defining different visibility attributes for each of the two morphisms, h( ) and hh( ), the morphism hh( ) having private visibility and being used by a within the class and the morphism h( ) having public visibility and being used by other types.

5. The method of claim 1 comprising:
defining an inverse morphism, hInv( ), that operates, during execution, to create a middleware-specific-implementation instance whose delegate is the IDL instance.

6. The method of claim 5 wherein the middleware-specific-implementation is a CORBA implementation and wherein the implementation of the abstraction interface object model is a CORBA-implementation object model; and
wherein defining an inverse morphism, hInv( ) comprises:
defining hInv( ) to operate during execution, for exceptions, interfaces, and structs, to create a CORBA-implementation instance whose delegate is the IDL instance, and providing, in the CORBA-implementation object model, a corresponding type that possess a constructor accepting a corresponding IDL instance that is hidden from the application.

7. The method of claim 6 wherein defining an inverse morphism, hInv( ) comprises, for enum types, creating a mapping of static instances based on an underlying integer value of the enum type.

8. The method of claim 1 wherein applying a categorical-based generator that applies at least one morphism to the object model specification comprises:
mapping IDL sequences encountered in an IDL definition within the object model specification using a template that emits a Java array-to-array adapter.

9. The method of claim 1 wherein applying a categorical-based generator that applies at least one morphism to the object model specification comprises:
for each IDL type in the object model specification, emitting programming language types including:
i) an interface helper that declares the morphism and is used for constructing the abstraction interface object model as an interface object model;
ii) a functional interface that declares application functionality and extends and implements the helper; and
iii) the middleware-specific-implementation object model that provide a functional implementation that implements and extends the functional interface.

10. The method of claim 1 comprising:
during application runtime, encountering a middleware-specific reference in application code;
in response, encapsulating the middleware-specific reference in an appropriate interface in the implementation of the abstraction interface object model;
exposing the middleware-specific reference as an interface in the abstraction interface object model to allow the middleware-specific reference exposed as an interface to becomes an invocation point for that middleware-specific reference.

11. The method of claim 1 wherein applying a categorical-based generator that applies at least one morphism to the object model specification comprises:

for each interface that may require downcasting, providing a static downcast method which applies the at least one morphism on the interface that requires downcasting to:
  i) retrieve a delegate;
  ii) apply a middleware-specific narrow operator to perform downcasting; and
  iii) invoke an inverse morphism to create a required interface in the abstraction interface object model.

12. The method of claim 1 wherein applying a categorical-based generator that applies at least one morphism to the object model specification comprises:
  for each middleware-specific type in the object model specification, performing a reflection technique and emitting corresponding types in the abstraction interface object model and in the implementation of the abstraction interface object model.

13. The method of claim 12 wherein performing a reflection technique comprises:
  examining middleware-specific markers in object model specification generated code to identify types that are middleware-specific;
  obtaining information for generating each type in the abstraction interface object model and in the implementation of the abstraction interface object model; and
  recursively discovering all dependent types to fully construct the abstraction interface object model and in the implementation of the abstraction interface object model.

14. A computer system comprising:
  a memory;
  a processor,
  an interconnection mechanism coupling the memory and the processor;
  wherein the memory is encoded with a generator that when executed on the processor causes the computer system to perform the operations of:
  receiving an object model specification defining application semantics for an application to access, via invocations, objects identified in the object model specification;
  applying a categorical-based generator that applies at least one morphism to the object model specification, application of the categorical-based generator generating:
  i) an abstraction interface object model, the abstraction interface object model preserving application semantics defined within the object model specification and being independent of a middleware object access mechanism used to access data within objects corresponding to the object model specification; and
  ii) an implementation of the abstraction interface object model for a particular middleware object access mechanism used to access data within objects corresponding to the object model specification,
  wherein object model specification is defined in an interface description language (IDL) that includes a plurality of IDL types; and
  wherein applying a categorical-based generator that applies at least one morphism to the object model specification comprises:
    visiting each IDL type defined in the IDL once;
    for each IDL type visited applying the at least one morphism to map the IDL type one-to-one and onto into application types by defining at least one corresponding morphism for that type within the abstraction interface object model, the corresponding morphism preserving inheritance among application interfaces defined in the abstraction interface object model and preserving all relationships among the application interfaces; and
    for each type in the object model specification, defining two morphisms, h( ) and hh( ), with common implementations but each having different return types, the return type of morphism hh( ) being a categorical return type corresponding to a middleware-specific type, the return type of the morphism h( ) anonymizing the middleware-specific type into a language type generic to the application.

15. A computer readable medium encoded with processing logic that, when executed on a processor in a computer system provides a generator that causes the computer system to perform the operations of:
  receiving an object model specification defining application semantics for an application to access, via invocations, objects identified in the object model specification;
  applying a categorical-based generator that applies at least one morphism to the object model specification, application of the categorical-based generator generating:
  i) an abstraction interface object model, the abstraction interface object model preserving application semantics defined within the object model specification and being independent of a middleware object access mechanism used to access data within objects corresponding to the object model specification; and
  ii) an implementation of the abstraction interface object model for a particular middleware object access mechanism used to access data within objects corresponding to the object model specification,
  wherein object model specification is defined in an interface description language (IDL) that includes a plurality of IDL types; and
  wherein applying a categorical-based generator that applies at least one morphism to the object model specification comprises:
    visiting each IDL type defined in the IDL once;
    for each IDL type visited applying the at least one morphism to map the IDL type one-to-one and onto into application types by defining at least one corresponding morphism for that type within the abstraction interface object model, the corresponding morphism preserving inheritance among application interfaces defined in the abstraction interface object model and preserving all relationships among the application interfaces; and
    for each type in the object model specification, defining two morphisms, h( ) and hh( ), with common implementations but each having different return types the return type of morphism hh( ) being a categorical return type corresponding to a middleware-specific type, the return type of the morphism ho anonymizing the middleware-specific type into a language type generic to the application.

16. A computer system comprising:
  a memory;
  a processor,
  an interconnection mechanism coupling the memory and the processor;
  wherein the memory is encoded with a generator that when executed on the processor provides a means to abstract an object model, said means including:

means for receiving an object model specification defining application semantics for an application to access, via invocations, objects identified in the object model specification;

means for applying a categorical-based generator that applies at least one morphism to the object model specification, application of the categorical-based generator including means for generating:

i) an abstraction interface object model, the abstraction interface object model preserving application semantics defined within the object model specification and being independent of a middleware object access mechanism used to access data within objects corresponding to the object model specification; and ii) an implementation of the abstraction interface object model for a particular middleware object access mechanism used to access data within objects corresponding to the object model specification;

wherein object model specification is defined in an interface description language (IDL) that includes a plurality of IDL types; and wherein means for applying a categorical-based generator that applies at least one morphism to the object model specification comprises:

means for visiting each IDL type defined in the IDL once;

for each IDL type visited means for applying the at least one morphism to map the IDL type one-to-one and onto into application types by defining at least one corresponding morphism for that type within the abstraction interface object model, the corresponding morphism preserving inheritance among application interfaces defined in the abstraction interface object model and preserving all relationships among the application interfaces; and for each type in the object model specification, means for defining two morphisms, h( ) and hh( ) with common implementations but each having different return types the return type of morphism hh( ) being a categorical return type corresponding to a middleware-specific type, the return type of the morphism h( ) anonymizing the middleware-specific type into a language type generic to the application.

17. The method of claim 1 wherein receiving comprises:

receiving an object model specification defining application semantics for an application to access, via invocations, objects identified in the object model specification, the object model specification identifying a particular middleware;

and wherein applying comprises:

applying a categorical-based generator that applies at least one morphism to the object model specification, application of the categorical-based generator generating:

i) an abstraction interface object model, the abstraction interface object model preserving application semantics defined within the object model specification and being independent of the particular middleware the received object model specification identifies; and ii) an implementation of the abstraction interface object model according to the particular middleware the received object model specification identifies.

18. The method of claim 17 wherein applying comprises:

applying a categorical-based generator that applies at least one morphism to the object model specification, application of the categorical-based generator generating:

i) an abstraction interface object model, the abstraction interface object model preserving application semantics defined within the object model specification and being independent of the particular middleware the received object model specification identifies; and ii) an implementation of the abstraction interface object model according to the particular middleware the received object model specification identifies, wherein the implementation of the abstraction interface object model according to the particular middleware is hidden from an application developer.

\* \* \* \* \*